(12) United States Patent
Grose et al.

(10) Patent No.: US 8,084,114 B2
(45) Date of Patent: Dec. 27, 2011

(54) REINFORCED RAMPDOWN FOR COMPOSITE STRUCTURAL MEMBER AND METHOD FOR SAME

(75) Inventors: Douglas L. Grose, Algona, WA (US); Marc J. Piehl, Renton, WA (US); Douglas A. Frisch, Renton, WA (US); Joseph L. Sweetin, Lake Forest Park, WA (US); Gary J. Peffers, Pittsboro, IN (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/965,410

(22) Filed: Dec. 27, 2007

(65) Prior Publication Data

US 2008/0138584 A1 Jun. 12, 2008

Related U.S. Application Data

(62) Division of application No. 11/065,350, filed on Feb. 24, 2005, now Pat. No. 7,531,058.

(51) Int. Cl.
*B32B 3/00* (2006.01)
*E04C 2/36* (2006.01)
*B64C 1/00* (2006.01)
*B64C 3/20* (2006.01)

(52) U.S. Cl. ............ 428/73; 428/60; 428/109; 428/114; 428/172; 428/192; 244/123.5; 244/123.6; 244/126; 52/793.1

(58) Field of Classification Search .............. 428/60, 428/61, 105, 109, 112, 113, 114, 130, 172, 428/192, 73; 244/119, 123.1, 125, 126, 123.13, 244/123.5, 123.6; 52/793.1
See application file for complete search history.

(56) References Cited

U.S. PATENT DOCUMENTS

| | | | | |
|---|---|---|---|---|
| 4,331,723 A | * | 5/1982 | Hamm | 428/61 |
| 4,826,106 A | * | 5/1989 | Anderson | 244/117 R |
| 4,869,770 A | | 9/1989 | Christensen et al. | |
| 5,558,919 A | * | 9/1996 | Toni et al. | 428/116 |
| 5,685,940 A | | 11/1997 | Hopkins et al. | |
| 5,736,222 A | | 4/1998 | Childress | |
| 5,876,540 A | | 3/1999 | Pannell | |
| 5,919,413 A | | 7/1999 | Avila | |
| 5,935,475 A | | 8/1999 | Scoles et al. | |
| 5,935,680 A | | 8/1999 | Childress | |
| 5,935,698 A | | 8/1999 | Pannell | |
| 5,958,550 A | | 9/1999 | Childress | |
| 5,968,639 A | | 10/1999 | Childress | |
| 5,980,665 A | | 11/1999 | Childress | |
| 6,027,798 A | | 2/2000 | Childress | |
| 6,436,507 B1 | | 8/2002 | Pannell | |
| 6,562,436 B2 | | 5/2003 | George et al. | |
| 6,689,448 B2 | | 2/2004 | George et al. | |
| 6,709,538 B2 | | 3/2004 | George et al. | |
| 6,814,916 B2 | | 11/2004 | Willden et al. | |
| 2002/0038687 A1 | | 4/2002 | Anderson et al. | |
| 2002/0157785 A1 | | 10/2002 | Anderson et al. | |
| 2003/0190455 A1 | | 10/2003 | Burgess et al. | |
| 2003/0196741 A1 | | 10/2003 | Burgess et al. | |

* cited by examiner

*Primary Examiner* — Donald J Loney
(74) *Attorney, Agent, or Firm* — Alston & Bird LLP

(57) ABSTRACT

A composite member with a reinforced rampdown or taper has a composite noodle bonded to an end of a core to fill the taper.

13 Claims, 2 Drawing Sheets

REINFORCED RAMPDOWN FOR COMPOSITE STRUCTURAL MEMBER AND METHOD FOR SAME

CROSS-REFERENCE TO RELATED APPLICATIONS

This application is a divisional of U.S. application Ser. No. 11/065,350, filed Feb. 24, 2005 now U.S Pat. No. 7,531,058, which is hereby incorporated herein in its entirety by reference.

FEDERALLY SPONSORED RESEARCH OR DEVELOPMENT

The research underlying this invention was supported in part with funds from the U.S. Air Force grant no. F33615-98-3-5103. The United States Government may have an interest in the subject matter of this invention.

BACKGROUND OF THE INVENTION

1. Field of the Invention

The present invention relates to the formation of composite structural members and, more particularly, relates to a composite structural member having a support member with a core between laminate sheets.

2. Description of Related Art

A sandwich panel is formed of a core that is sandwiched between composite laminate sheets. The laminate sheets can be formed of various conventional composite materials using any of various methods. For example, the sheets can be formed by disposing preimpregnated plies around the core and consolidating and curing the plies. The core can be a lightweight honeycomb or foam to provide high strength and/or stiffness with relatively low weight.

The core of such a composite member typically has a substantially uniform thickness throughout except at the ends, where the core defines a rampdown or taper in the composite member. The tapered edge defines a transition between the core and a peripheral portion where the laminate sheets are joined directly together without the core. The tapered portion is relatively weak. Therefore, additional plies can be added in the tapered region to reinforce the region. These additional plies increase the weight, time for manufacture, and cost the panels.

SUMMARY OF THE INVENTION

The present invention provides a composite member such as a sandwich panel with a reinforced rampdown or tapered portion. The tapered portion is reinforced by adding a laminate support member at the apex of the core taper.

According to one embodiment, the composite member includes first and second laminate sheets that define opposite sides of the composite member. A core and a laminate support member are disposed in a space defined between the two sheets. The core can be formed of a honeycomb material or foam, and the laminate member can be formed of a plurality of layers of composite material, such as plies disposed in alternate directions. In particular, the support member is disposed proximate the core in a tapering portion of the space where the sheets are angled together. Thus, the support member supports the composite member. For example, the sheets can be substantially parallel in a first portion of the member, with the core disposed between the sheets. At an edge of the core, the sheets can be angled together to define the tapering portion, with the support member disposed between the sheets in the tapering portion. Beyond the tapered portion, i.e., opposite the tapering portion from the first portion, the composite member can define a second portion in which the sheets are in contact. The support member can be adjacent the core and joined to the core by an adhesive. The support member can define a triangular cross-sectional shape that corresponds to the tapering portion of the space between the first and second sheets. In some cases, the core can also define a partially tapering portion that corresponds to the tapering portion of the space.

The present invention also provides a method of forming a composite member. The method includes providing the core and laminate support member between the first and second laminate sheets. The support member can be cured before assembly with the sheets, or the support member can be disposed in an uncured condition and then cured between the sheets, e.g., while also curing the sheets. In any case, the support member can be formed of layers of composite material, which can include plies disposed in alternate directions.

The sheets can be joined at a position opposite the support member from the core, and the support member can be joined to the core, e.g., with a foaming adhesive. In some cases, the core can be provided with a tapering portion that defines a surface adjacent the support member.

BRIEF DESCRIPTION OF THE DRAWINGS

The accompanying drawings illustrate preferred and exemplary embodiments and are not necessarily drawn to scale.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth. Like numbers refer to like elements throughout.

Figure 1:
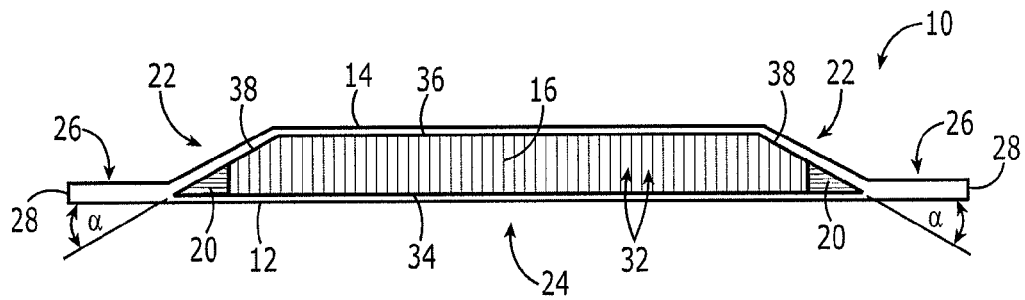
FIG. 1 is a section view illustrating a composite member.

A composite structural member 10 according to one embodiment of the present invention is shown in FIG. 1. The composite member 10 is a sandwich panel that includes first and second laminate sheets 12, 14 over a core 16. A laminate support member 20 is disposed between the sheets 12, 14 proximate to the core 16 at the end of its taper 22. The taper 22 defines a transition between a region 24 where the core 16 is disposed between the sheets 12, 14, and a second region 26 where the sheets 12, 14 contact to form a coreless laminate. The support member 20 is disposed where the sheets come together, a region that is susceptible to cracking.

The sheets 12, 14 typically are fiber reinforced composite and may be wing panels for aircraft. Composite materials are further described in U.S. Pat. Nos. 6,562,436; 6,689,448; and 6,709,538, which are incorporated by reference.

The matrix material can be thermoplastic or thermoset polymeric resins. Exemplary thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone (PEEK™, a trademark of Victrex PLC Corporation, Thorntons Cleveleys Lancashire, UK); polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); or poly(phenylene sulfides) (PPS).

The materials used for the composite structural member 10 can be selected, at least in part, according to the intended use of the member 10, as a structural panel for an aircraft, or other aerospace structures, automobiles, marine vehicles, other vehicles, buildings and other structures, and the like.

The core 16 is lightweight such as honeycomb made from aluminum, other metals, fiberglass-reinforced phenolic or other resin, resin-coated paper, or the like, or foam such as Rohacell®, a polymethacrylimide—sold by Roehm Gmbh & Co., Darmstadt, Germany.

The core 16 can be cut or otherwise formed to a configuration corresponding to the desired dimensions of the composite member 10. In particular, the ends of the core 16 can be formed (or machined) without thin portions that might be subject to breaking. For example, the core 16 can define a substantially rectangular prismatic shape. In some cases, the core 16 can define acute or obtuse angles such that at least a portion of the core 16 defines a tapering shape. For example, as illustrated in FIG. 1, the core 16 can define a truncated tapering portion at the periphery of the core 16. That is, a first side 34 of the core 16 can be planar, a second opposite side 36 can be planar except for an angled peripheral portion 38 that is angled toward the plane defined by the first side 34, and a transverse surface 40 can connect the first and second sides 34, 36. The core 16 can be cut to the desired configuration, e.g., using an ultrasonically reciprocating knife, or the core 16 can be otherwise formed in the desired configuration. Typically, however, the core 16 is cut to a shape smaller than the entire space to be defined between the sheets 12, 14, i.e., so that the sheets 12, 14 are also configured to receive the laminate support member 20 in the tapering portion 22. Thus, a weak edge at the periphery of the core 16 can be avoided, and instead the periphery of the core 16 can be supported by the support member 20.

The laminate support member 20 is also disposed between the laminate sheets 12, 14. In particular, one of the laminate support members 20 can be provided at each end of the core 16. That is, four of the laminate support members 20 can be provided for a composite member having a rectangular core, such as the core 16 illustrated in FIG. 1, with one support member 20 proximate each edge of the rectangular core 16. Alternatively, the support member 20 can be a continuous piece that extends along two or more of the edges of the core 16. Each laminate support member 20 is typically configured to be disposed proximate the core 16 so that the laminate support member 20 defines a rampdown or taper corresponding to the tapering portion 22 of the laminate sheet(s). As illustrated in FIG. 1, the support member 20 is a wedge positioned at the transition of the taper 22 where the laminate sheets 12, 14 are directly joined to fill the gap. The support member 20 is used where the sheet(s) 12, 14 change direction to separate and form an angle α.

Figure 2:
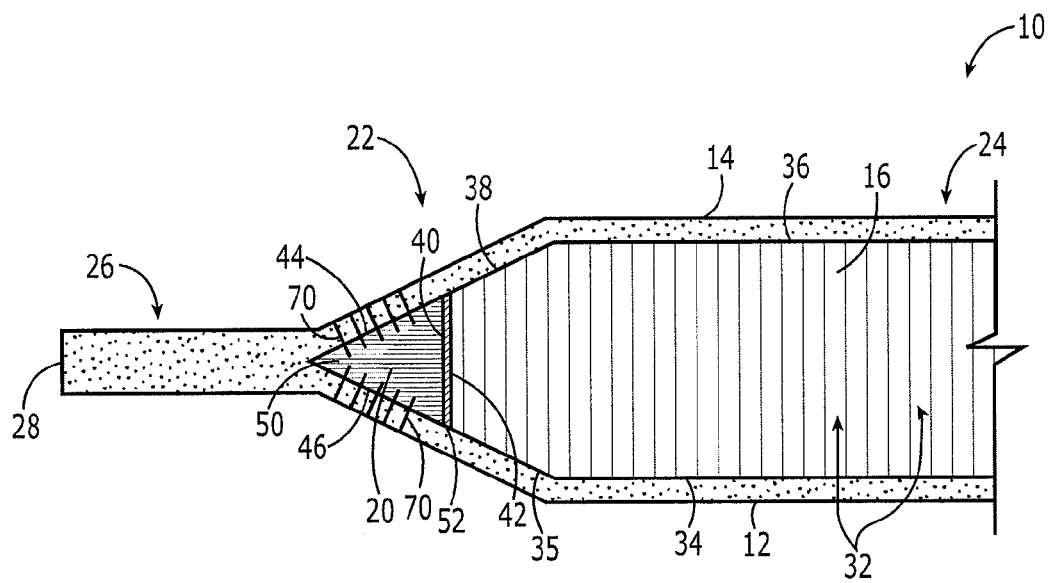
FIG. 2 is a section view partially illustrating a composite member.
Figure 3:
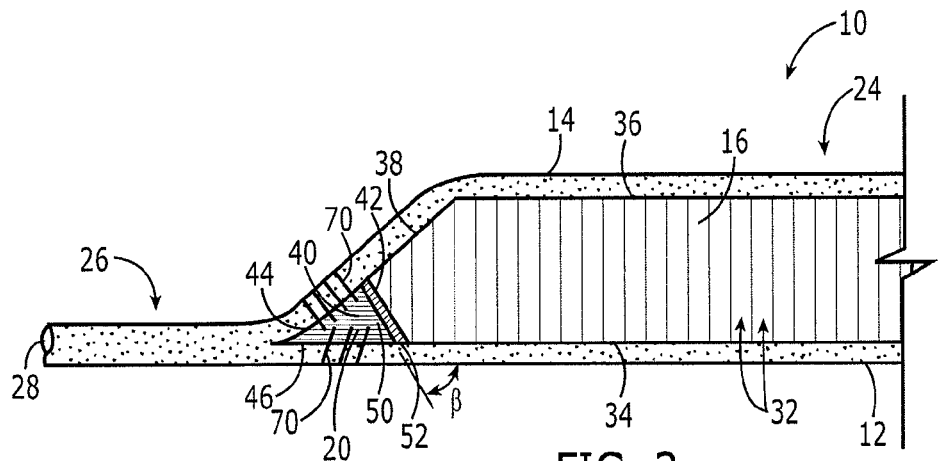
FIG. 3 is a section view partially illustrating another composite member.

Both sheets 12, 14 can diverge as shown in FIG. 2. The first side 34 of the core 16 defines an angled portion 35. FIG. 3 illustrates an embodiment in which the side 44 of the support member 20 is curved, i.e., to reduce slightly the angle α defined at the intersection of the first and second sheets 12, 14. The angled portion 38 of the core 16 can also be curved.

In some cases, the core 16 can stop before the taper 22 so that the entire tapering space is filled with the support member 20. This approach usually would add a small amount of weight to the panel because the support member outweighs the core. Further, the transverse surface 40 of the core 16 can be disposed at other configurations than that shown in FIGS. 1 and 2. For example, the transverse surface 40 can define an obtuse angle β relative to the first side 34 of the core 16 as shown in FIG. 3.

Figure 5:
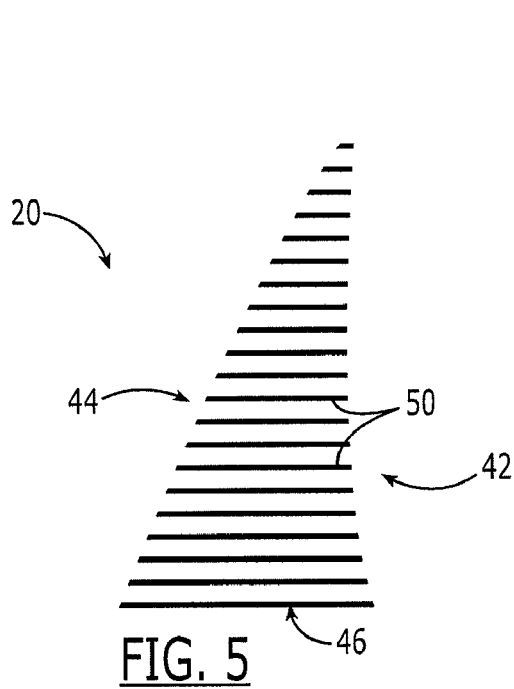
FIG. 5 is an expanded section view schematically illustrating the lay-up of the support member.

As shown in FIG. 5, the support member 20 is a laminated composite material sufficiently thick to fill the space between the laminate sheets 12, 14 in the taper 22. The support member 20 can also be formed or cut to a size that is slightly greater than the size of the space to "overfill" the space. A support member that is slightly greater in size than the space may be designed to allow for differing compaction rates during cure, so that the final cured part does not have any undesirable steps or mismatches in contour.

The support member 20 is typically stronger and stiffer than the core 16 on a volumetric basis. In some cases, the support member 20 can have a strength that is between about 3 and 10 times as great as the strength of an equal volume of the material of the core 16. The support member 20 is often bonded to the core 16 with an adhesive 52, especially a foaming adhesive to fill any gaps or space between the support member 20 and the core 16.

Figure 6:
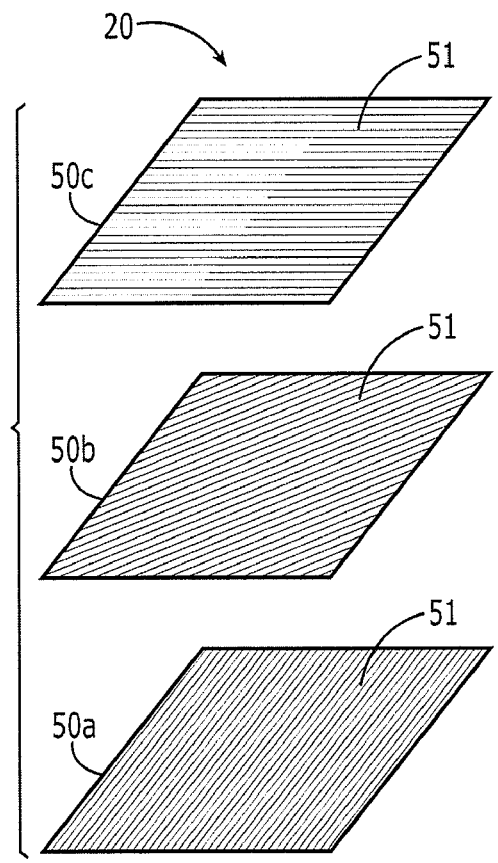
FIG. 6 is an expanded perspective view schematically illustrating several of the layers of the support member.

Reinforcement material 51 in the support member 20 is disposed in the direction of a first axis (0°), and at an angle relative to the first direction, such as 45° clockwise relative to the first axis (+45), 45° counter-clockwise relative to the first axis (−45°), and/or 90° clockwise relative to the first axis (90°) in the various layers 50a, 50b, 50c. The ply orientation provides particular strength, stiffness, or thermal expansion characteristics. In FIG. 6, reinforcement fibers 51 in the layer 50a are disposed in a first direction (0°), and fibers 51 in layers 50b, 50c are disposed at 45° and 90°, respectively. A composite noodle for filling a radius gap, and the formation of composite members with directional properties, is further described in U.S. Pat. No. 6,562,436, which is incorporated by reference. The support member 20 corresponds to the noodle and functions in essentially the same way.

If the support member 20 has a coefficient of expansion similar to that of the laminate sheets 12, 14, stress induced by temperature changes is reduced.

The support member 20 can be cured separately from the laminate sheets 12, 14 or in conjunction with the curing of the laminate sheets 12, 14. That is, according to one embodiment, the layers 50 of the support member 20 are assembled and cured, e.g., by compressing and heating the layers 50. Thereafter, the cured support member 20 is disposed with the core 16 between the uncured laminate sheets 12, 14, and the laminate sheets 12, 14 are cured. In this case, the sides 42, 44, 46 of the support member 20 can be prepared to promote adhesion between the support member 20 and the laminate sheets 12, 14 and the core 16. For example, the surfaces 42, 44, 46 of the support member 20 can be roughened by blasting, chemical etching, sanding, or the like. Alternatively, the layers 50 of the support member 20 can be disposed in the uncured condition with the core 16 between the laminate sheets 12, 14, and both the support member 20 and the laminate sheets 12, 14 can be co-cured in a combined operation. Alternatively, the layers 50 of the support member 20 can be disposed in the uncured condition with one or both of the laminate sheets 12, 14, cured with the laminate sheet(s) 12, 14, and then assembled with the core 16. If the support member 20 is cured without the core 16 being in place against the member 20, the configuration of the support member 20 can be maintained by using a tool or dam device against the support member 20. In any case, the adhesive 52 can be provided to connect the support member 20 to the core 16.

Figure 4:
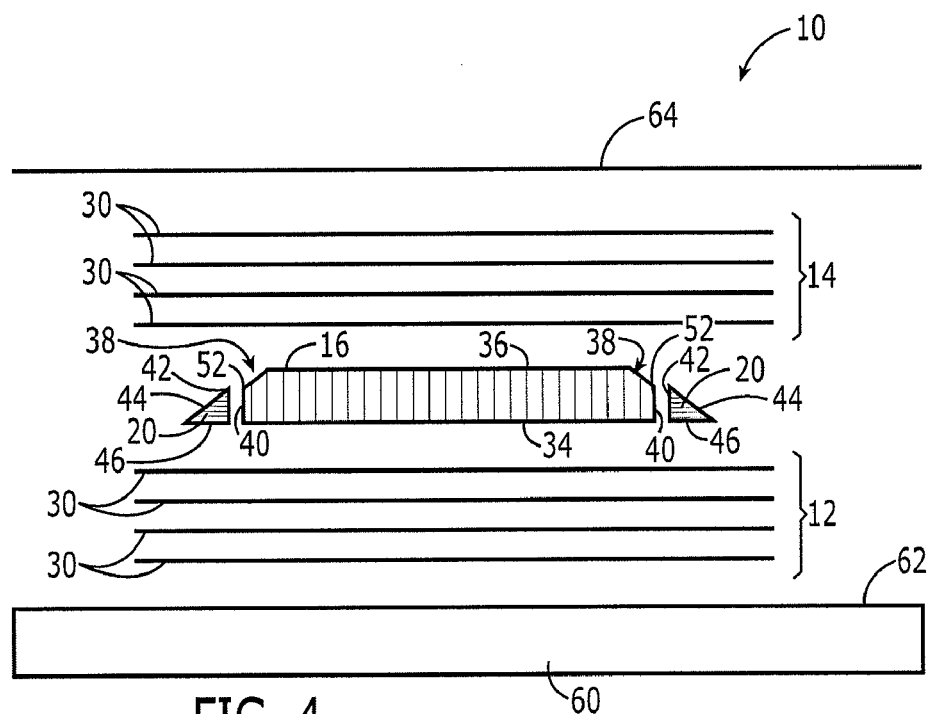
FIG. 4 is an expanded section view schematically illustrating the lay-up of the structural member.

FIG. 4 illustrates the lay-up of the composite member 10 according to one embodiment of the present invention, with the composite member 10 shown in an expanded configuration for purposes of clarity. The composite member 10 is positioned on a contoured surface 62 of a tool or mandrel 60.

The layers 30 of the first laminate sheet 12 are disposed on the mandrel 60, and the core 16 and the support member 20 are disposed on the first laminate sheet 12. Two support members 20 are illustrated in FIG. 4, but any number of the support members 20 can be provided, typically according to the configuration of the composite member 10. Each support member 20 can be a unitary member or element and, in particular, a cured or partially-cured member. Alternatively, the layers of each support member 20 can be disposed separately and consecutively on the first laminate sheet 12. In either case, the adhesive 52 can be provided between the support member 20 and the core 16 to promote joining. The layers 30 of the second laminate sheet 14 are disposed over the core 16 and the support members 20 so that the core 16 and support members 20 are sandwiched between the laminate sheets 12, 14. Thereafter, a vacuum bag 64 can be disposed over the composite member 10. The resulting lay-up is then subjected to a curing operation that includes heating and compressing the member 10. For example, in one typical operation, the composite member 10 is disposed in an autoclave, where it is heated to a temperature of between about 150° F. and 250° F. and subjected to a pressure of between about 50 psi and 150 psi for an interval of between about 30 minutes and 120 minutes. Thus, the layers 30 of the laminate sheets 12, 14, and optionally the layers 50 of the support member(s) 20, are cured in the desired configuration.

The support member 20 can be connected or engaged to the laminate sheets 12, 14 so that the configuration of the support member 20 relative to the sheets 12, 14 and core 16 is maintained, e.g., during the curing operation. In some cases, an adhesive, such as a film adhesive, is provided between the support member 20 and one or both of the sheets 12, 14. An adhesive with a relatively low curing temperature can be used so that the adhesive can be cured before the curing of the other components of the composite member 10. In addition or alternative to the use of an adhesive between the support member 20 and the sheets 12, 14, the support member 20 can be otherwise engaged with the sheets 12, 14, such as with a mechanical connection. For example, as shown in FIGS. 2 and 3, a plurality of pins 70 ("z-pins") can be disposed at least partially through the sheets 12, 14 and the support member 20. The z-pins 70 can be formed of various materials such as titanium or graphite, and are typically rigid members that provide a mechanical connection between the sheets 12, 14 and the support member 20. In some cases, the z-pins 70 are ultrasonically driven into the member 10. Z-pins and methods of using z-pins are further described in U.S. Pat. Nos. 4,869, 770; 5,685,940; 5,736,222; 5,876,540; 5,980,665; and 6,027, 798, which are incorporated by reference.

The invention is not limited to the specific disclosed embodiments. Although specific terms are employed, they are used in a generic and descriptive sense only and not for purposes of limitation.

What is claimed is:

1. A composite sandwich panel comprising:
   a honeycomb or foam core;
   at least two laminate sheets positioned proximate opposite faces of the core and extending beyond the core to a coreless laminate region in which the laminate sheets contact one another, the at least two laminate sheets defining a space in the form of a taper between the core and the coreless laminate region, the at least two laminate sheets extending parallel to one another across a medial portion of the core; and
   a laminate support member filling the taper but not extending beyond the taper, wherein the laminate support member comprises a plurality of stacked plies with at least some of the stacked plies being substantially parallel to portions of each of the at least two laminate sheets that extend along the opposed faces of the medial portion of the core and that form the coreless laminate region.

2. A composite according to claim 1 wherein the laminate support member includes fiber reinforcement.

3. A composite according to claim 2 wherein the reinforcement is disposed in at least two alternate directions in different plies.

4. A composite according to claim 1, further comprising an adhesive bonding the laminate support member to a core, wherein the adhesive extends between the at least two laminate sheets and separates the laminate support member from the core with the laminate support member on one side of the adhesive and the core other another side of the adhesive.

5. A composite according to claim 1, further comprising a plurality of z-pins extending at least partially through at least one of the laminate sheets and the support member.

6. A composite sandwich panel comprising:
   a honeycomb or foam core;
   at least two laminate sheets positioned proximate opposite faces of the core and extending beyond the core to a coreless laminate region in which the laminate sheets contact one another, the at least two laminate sheets defining a space in the form of a taper between the core and the coreless laminate region, the at least two laminate sheets extending parallel to one another across a medial portion of the core;
   a laminate support member filling the taper but not extending beyond the taper, wherein the laminate support member comprises a plurality of stacked plies with at least some of the stacked plies being substantially parallel to portions of each of the at least two laminate sheets that extend along the opposed faces of the medial portion of the core and that form the coreless laminate region, and wherein the laminate support member includes fiber reinforcement that is disposed in at least two alternate directions in different plies;
   an adhesive bonding the laminate support member to the core; and
      a plurality of z-pins extending at least partially through at least one of the laminate sheets and the support member.

7. A composite sandwich panel according to claim 1 further comprising an adhesive between the laminate support member and the core, while an interface between the laminate support member and the laminate face sheets is free of adhesive.

8. A composite sandwich panel according to claim 1 further comprising z-pins extending through the laminate sheets and into the laminate support member, while an interface between the core and the laminate support member is free of z-pins.

9. A composite sandwich panel according to claim 1 wherein the core includes a plurality of edges that extend at an angle to one another, and wherein the laminate support member is positioned proximate the plurality of edges of the core.

10. A composite sandwich panel according to claim 6 wherein an interface between the laminate support member and the laminate face sheets is free of adhesive.

11. A composite sandwich panel according to claim 6 wherein an interface between the core and the laminate support member is free of z-pins.

12. A composite sandwich panel according to claim 6 wherein the core includes a plurality of edges that extend at an angle to one another, and wherein the laminate support member is positioned proximate the plurality of edges of the core.

13. A composite sandwich panel according to claim 6, wherein the adhesive extends between the at least two laminate sheets and separates the laminate support member from the core with the laminate support member on one side of the adhesive and the core other another side of the adhesive.

* * * * *